United States Patent
Luo et al.

(10) Patent No.: US 10,175,835 B2
(45) Date of Patent: Jan. 8, 2019

(54) DETECTION PLATE, DETECTION ASSEMBLY AND DETECTION METHOD FOR DETECTING RIPPLES OF TOUCH SCREEN

(71) Applicants: BOE Technology Group Co., Ltd., Beijing (CN); Hefei Xinsheng Optoelectronics Technology Co., Ltd., Anhui (CN)

(72) Inventors: Hongqiang Luo, Beijing (CN); Ming Hu, Beijing (CN); Taofeng Xie, Beijing (CN); Jun Xu, Beijing (CN); Wenjie Shi, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 313 days.

(21) Appl. No.: 15/122,348

(22) PCT Filed: May 18, 2015

(86) PCT No.: PCT/CN2015/079179
§ 371 (c)(1),
(2) Date: Aug. 29, 2016

(87) PCT Pub. No.: WO2016/107051
PCT Pub. Date: Jul. 7, 2016

(65) Prior Publication Data
US 2016/0370896 A1 Dec. 22, 2016

(30) Foreign Application Priority Data
Dec. 30, 2014 (CN) .......................... 2014 1 0842485

(51) Int. Cl.
*G06F 3/044* (2006.01)
*G06F 3/041* (2006.01)
*G06F 11/22* (2006.01)

(52) U.S. Cl.
CPC .............. *G06F 3/044* (2013.01); *G06F 3/041* (2013.01); *G06F 11/2221* (2013.01); *G06F 2203/04103* (2013.01)

(58) Field of Classification Search
CPC ...... G06F 3/044; G06F 11/2221; G06F 3/041; G06F 2203/04103
See application file for complete search history.

(56) References Cited

U.S. PATENT DOCUMENTS

| 8,564,573 B2 | 10/2013 | Prat et al. |
| 2010/0039639 A1 | 2/2010 | Rooke |

(Continued)

FOREIGN PATENT DOCUMENTS

| CN | 101295219 A | 10/2008 |
| CN | 102681742 A | 9/2012 |

(Continued)

OTHER PUBLICATIONS

Fourth Office Action from Chinese Patent Application No. 201410842485.9, dated Aug. 10, 2017, 17 pages.

(Continued)

*Primary Examiner* — Abhishek Sarma
(74) *Attorney, Agent, or Firm* — Westman, Champlin & Koehler, P.A.

(57) ABSTRACT

A detection method for detecting ripples of a touch screen, and a detection plate and a detection assembly used in the method are disclosed by embodiments of the present invention, the detection method comprising steps of: manufacturing a detection plate, one surface of which is provided with a plurality of grids arranged in a regular array, which grids (Continued)

are formed by intersecting a plurality of grid lines extending in a first direction and a plurality of grid lines extending in a second direction; placing the surface of the detection plate at a predetermined angle with respect to a surface of one side of the touch screen where the a glass plate is located, such that the grid lines on the detection plate are imaged on the touch screen; and observing grid lines imaged on the touch screen, and determining the existence of ripples at a position of the touch screen corresponding to a curved portion of the imaged grid lines in case of the curved portion of the imaged grid lines. According to the embodiments of the invention, conditions of the ripples on the touch screen can be determined intuitively and easily according to curved conditions of the grid lines imaged on the touch screen, by imaging the grid lines on the detection plate onto the touch screen, such that the accuracy of detection is enhanced.

20 Claims, 1 Drawing Sheet

(56) References Cited

U.S. PATENT DOCUMENTS

| 2012/0133761 A1 | 5/2012 | Cho et al. |
| 2014/0085222 A1 | 3/2014 | Park et al. |

FOREIGN PATENT DOCUMENTS

| CN | 103177983 A | 6/2013 |
| CN | 103673934 A | 3/2014 |
| CN | 104484072 A | 4/2015 |

OTHER PUBLICATIONS

Second Office Action, including Search Report, for Chinese Patent Application No. 201410842485.9, dated Mar. 15, 2017, 20 pages.
First Office Action, including Search Report, for Chinese Patent Application No. 201410842485.9, dated Dec. 22, 2016, 18 pages.
International Search Report and Written Opinion, including English translation of Box No. V, for International Application No. PCT/CN2015/079179, dated Sep. 25, 2015, 8 pages.

DETECTION PLATE, DETECTION ASSEMBLY AND DETECTION METHOD FOR DETECTING RIPPLES OF TOUCH SCREEN

CROSS-REFERENCE TO RELATED APPLICATION

This application is a Section 371 National Stage Application of International Application No. PCT/CN2015/079179, filed on 18 May 2015, entitled "Detection Plate, Detection Assembly and Detection Method for Detecting Ripples of Touch Screen", and claims priority of Chinese Patent Application No. 201410842485.9 filed on Dec. 30, 2014 in the State Intellectual Property Office of China, the disclosures of which are incorporated herein by their reference.

BACKGROUND OF THE INVENTION

Field of the Invention

Embodiments of the present invention relate to the technical field of detection technology for touch screen, and in particular to a detection plate, a detection assembly and a detection method for detecting ripples of touch screen.

Description of the Related Art

In recent year, capacitive touch screens are widely used in some fields such as mobile-phone, tablet computer, etc. A traditional capacitive touch screen is typically constructed by bonding a layer of cover glass and a layer of touch glass via an Optical Clear Adhesive (abbreviated as OCA herein after) or an Optical Clear Resin (abbreviated as OCR hereinafter), i.e., being implemented as a GG (Cover Lens+ Glass Sensor) structure. However, with persistent pursuit of lightweight, slim thickness and low cost of the touch screen, the GG structure is gradually replaced by alternative structures such as GF (Cover Lens/Film Sensor) structure, GFF (Cover Lens/Film Sensor/Film Sensor) structure, OGS (One glass Solution) structure, etc.

The GF or GFF structure is a structure formed by bonding a layer of cover glass and a layer or two layers of flexible touch sensitive film via an adhesive such as OCA or OCR. These two structures have certain advantages in lightweight, slim thickness, and low cost, becoming a predominant structure in the touch screen market. However, since the bonding between the cover glass and the touch sensitive film via OCA or OCR belongs to a process of adhering a flexible layer onto a rigid layer or adhering a rigid layer onto a flexible layer, which may easily introduce unevenness on the sensitive film, resulting in ripples (touch screen ripples) similar to water ripples, especially at the interface between an ink area and a viewing area of the touch screen, such that the product yield may be adversely affected.

In order to prevent unqualified touch screen products from entering the market, it is necessary to perform factory inspection on existence of ripples on touch screen products. In the prior art, such factory inspection is mainly conducted by comparison between each bonded finished touch screen and a standard sample by an operator to determine whether the bonded touch screen meets the requirement of certain factory specifications. However, such determination method conducted by means of manual comparison with a standard sample possesses certain degree of subjectivity, which may easily introduce incorrect determination, i.e., wrong inspection results, and thus is required to be implemented by highly specialized testing personnel. Therefore, a method which may inspect the ripples on a touch screen product easily and accurately is required.

SUMMARY OF THE INVENTION

Embodiments of the present invention has been made to overcome or alleviate at least one aspect of the above mentioned disadvantages and/or shortcomings, by providing a detection method for detecting ripples of a touch screen such that conditions of the ripples on the touch screen can be detected intuitively and easily.

The exemplary embodiments of the present application are accomplished through the following technical solutions:

According to an aspect of the exemplary embodiment of the present application, there is provided a method for detecting ripples of a touch screen, comprising steps of:

S1: manufacturing a detection plate, one surface of which is provided with a plurality of grids arranged in a regular array, which grids are formed by intersecting a plurality of grid lines extending in a first direction and a plurality of grid lines extending in a second direction;

S2: placing the surface of the detection plate at a predetermined angle with respect to a surface of one side of the touch screen where the a glass plate is located, such that the grid lines on the detection plate are imaged on the touch screen; and S3: observing grid lines imaged on the touch screen, and determining the existence of ripples at a position of the touch screen corresponding to a curved portion of the imaged grid lines in case that the curved portion of the imaged grid lines is present.

According to the detection method of the exemplary embodiment of the invention, conditions of the ripples on the touch screen can be determined intuitively and easily according to curved conditions of the grid lines imaged on the touch screen, by imaging the grid lines on the detection plate onto the touch screen, so as to prevent incorrect determination and enhance accuracy of detection.

According to an exemplary embodiment, the method for detecting ripples of a touch screen further comprises a step of:

S4: counting the number of the grids contained by the curved portion of the imaged grid lines in the direction thereof so as to determine the width of the ripples quantitatively.

According to an exemplary embodiment, the first direction and the second direction are arranged to be perpendicular to each other in the step S1.

According to an exemplary embodiment, the grids are formed as a 10 mm×10 mm array of grids in the step S1.

According to an exemplary embodiment, the detection plate is placed along each edge of the touch screen in the step S2.

According to an exemplary embodiment, the predetermined angle is configured to be 60° in the step S2.

According to an exemplary embodiment, the step S2 further comprises manufacturing a support for supporting at least one of both of the detection plate and the touch screen, such that the detection plate and the touch screen are placed at the predetermined angle and one edge of the detection plate is configured to be adjacent to one corresponding edge of the touch screen.

According to an exemplary embodiment, the support comprises a first support for holding the detection plate and a second support for holding the touch screen, the first support and the second support being configured to form the predetermined angle therebetween.

According to an exemplary embodiment, the first support comprises a first base for placing the detection plate, the first base being configured to be depressed below an upper surface of the first support and to form an opening area to expose the grid lines on the detection plate; and the second support comprises a second base for placing the touch screen, the second base being configured to be depressed below an upper surface of the second support.

According to an exemplary embodiment, the step S1 comprising: providing a rectangular base plate; manufacturing a paper sheet which is provided with a black background and a plurality of grids on the black background, the grids being arranged in the regular array and configured to be formed by intersecting a plurality of white grid lines extending in the first direction and a plurality of white grid lines extending in the second direction; and attaching the paper sheet onto the base plate so as to form the detection plate.

According to an exemplary embodiment, the step S1 comprising: providing a rectangular base plate which has a black surface, and forming a plurality of grids on the black surface of the rectangular base plate, the grids being arranged in the regular array and configured to be formed by intersecting a plurality of white grid lines extending in the first direction and a plurality of white grid lines extending in the second direction.

According to an exemplary embodiment, the touch screen comprises: a glass plate; an ink area configured to be formed at the periphery portions of the glass plate; an adhesive layer configured to cover the glass plate and the ink area; and a flexible film configured to be attached on the glass plate by the adhesive layer.

According to another aspect of the exemplary embodiment of the present application, there is provided a detection plate for detecting ripples of a touch screen, wherein a surface of the detection plate is provided with a plurality of grids arranged in a regular array, which grids are formed by intersecting a plurality of grid lines extending in a first direction and a plurality of grid lines extending in a second direction; and conditions of the ripples on the touch screen are determined according to curved conditions of the grid lines imaged on the touch screen, by imaging the grid lines on the detection plate onto the touch screen.

According to still another aspect of the exemplary embodiment of the present application, there is provided a detection assembly for detecting ripples of a touch screen, comprising: a detection plate, one surface of which is provided with a plurality of grids arranged in a regular array, which grids are formed by intersecting a plurality of grid lines extending in a first direction and a plurality of grid lines extending in a second direction; and a support for supporting at least one of both of the detection plate and the touch screen, such that the detection plate and the touch screen are placed at the predetermined angle and one edge of the detection plate is configured to be adjacent to one corresponding edge of the touch screen; wherein conditions of the ripples on the touch screen are determined according to curved conditions of the grid lines imaged on the touch screen, by imaging the grid lines on the detection plate onto the touch screen.

BRIEF DESCRIPTION OF THE DRAWINGS

The above and other features and advantages of the present invention will become more apparent and a more comprehensive understanding of the present invention can be obtained, by describing in detail exemplary embodiments thereof with reference to the accompanying drawings, in which.

DETAILED DESCRIPTION OF PREFERRED EMBODIMENTS OF THE INVENTION

Figure 1:
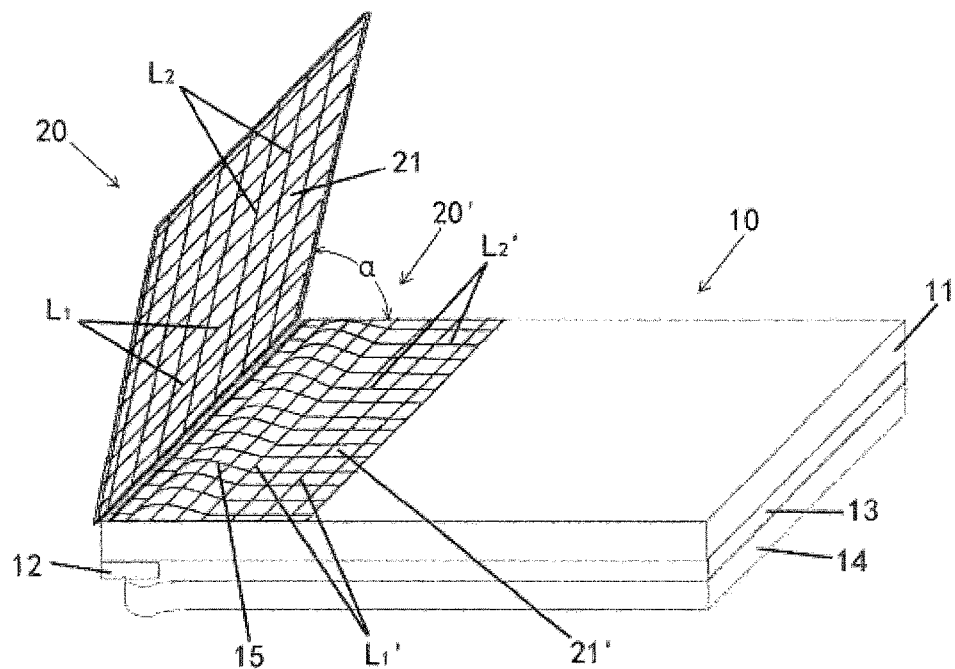
FIG. 1 illustrates, in perspective, a schematic diagram of operation principle of a method for detecting ripples of a touch screen using a detection plate, according to an exemplary embodiment of the invention.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the invention in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective thickness and shape of each layer are only intended to exemplarily illustrate the contents of the disclosure, rather than to demonstrate the practical dimension or proportion of the touch screen.

FIG. 1 illustrates, in perspective, a schematic diagram of operation principle of a method for detecting ripples of a touch screen 10 using a detection plate, according to an exemplary embodiment of the invention. As illustrated in FIG. 1, a touch screen 10 comprises: a glass plate 11, a non-transparent ink area 12 configured to be formed at the periphery portions of the glass plate 11 (only one ink area is illustrated at a periphery portion, for clarity); an adhesive layer 13, such as OCA or OCR, configured to be overlapping the glass plate 11 and the ink area 12; and a flexible film 14 configured to be attached on the glass plate 11 by the adhesive layer 13, the flexible film 14 being a touch sensitive film.

In order to detect conditions of the ripples on the touch screen 10, according to an exemplary embodiment, a detection plate 20 is provided, a surface of the detection plate 20 being provided with a plurality of grids 21 arranged in a regular array, which grids are formed by intersecting a plurality of grid lines L1 being aligned in parallel and extending in a first direction and a plurality of grid lines L2 being aligned in parallel and extending in a second direction. As illustrated in FIG. 1, the surface of the detection plate 20 which is formed with the grids 21 is placed at a predetermined angle α with respect to a surface of one side of the touch screen 10 where the a glass plate 11 is located, such that the detection plate 20 forms a detection plate image 20' on the touch screen 10; moreover, the grid lines L1 and L2 are imaged on the touch screen 10 so as to form imaged grid lines L1' and L2', such that imaged grids 21' which are formed by the imaged grid lines L1' and L2' are formed on the surface of the touch screen 10. If there is no ripple on the touch screen, then the grid lines imaged across the touch screen are configured in a regular linear arrangement; and if there are ripples on the touch screen, then the grid lines on the ripples of the touch screen are configured to be in a curved arrangement as a result of its deformation due to an optical phenomenon, while grid lines imaged at sites where there is no ripple are configured to be in a regular linear arrangement.

In an exemplary embodiment, as illustrated in FIG. 1, since there are ripples created at a boundary of the ink area 12 on the touch screen 10, then the grid lines L1' imaged on the surface of the touch screen 10 are curved at the boundary of the ink area 12. By observing positions of the curved imaged grid lines, then positions of the ripples on the touch screen 10 may be easily determined Furthermore, depending on the width of a curved imaged grid line portion 15, the size of the ripples on the touch screen 10 may also be determined More specifically, by counting the number of the grids 21' contained by the curved imaged grid line portion 15 in the direction of the curved imaged grid lines L1' thereof so as to determine the size of the ripples on the touch screen 10 quantitatively.

According to a specific exemplary embodiment, for easy calculation of the width of the ripples, the detection plate 20 is formed to be a rectangular plate with same shape as that of the touch screen 10; moreover, horizontal grid lines L1 are formed in parallel with its long sides while vertical grid lines L2 are formed in parallel with its short sides, and a plurality of square grids 21 are formed by intersection of these grid lines L1 and L2 which are perpendicular to each other. By way of example, each square grid 21 is dimensioned as 10 mm×10 mm Upon detection, as illustrated in FIG. 1, the detection plate 20 is place along an edge of the touch screen 10, such that a corresponding edge of the detection plate 20 is in parallel with and adjacent to, or coincides with the edge of the touch screen 10, and the predetermined angle α therebetween is formed to be 60°.

By configuring the angle between the detection plate 20 and the touch screen 10 as above, when the grid lines on the detection plate 20 are imaged on the touch screen 10, a width of a grid along the grid line L1' imaged on the touch screen 10 is equal to a half of a width of the corresponding grid on the detection plate. For example, when the grids on the detection plate 20 are dimensioned to be a 10 mm×10 mm, the width of a grid along the grid line L1' imaged on the touch screen 10 is equal to 5 mm. Therefore, according to such exemplary embodiment, calculation of the width of a grid may be facilitated quantitatively so as to facilitate calculation of the width of ripples on the touch screen 10. Furthermore, when the detection plate 20 is placed along an edge of the touch screen 10, the detection of the ripples at the periphery portion of the touch screen 10 (especially at the interface between the ink area and the viewing area) where ripples are prone to be created may be facilitated. By way of example, the detection plate 20 are placed along four edges of the touch screen 10 respectively so as to detect ripples at these four edges, and finally, the detection result at a site where the ripple conditions are most serious may be taken as a ripple detection result.

It should be appreciated by those skilled in this art that, the above embodiment is just an exemplary embodiment for ripple detection. In practice, the angle α between the detection plate 20 and the touch screen 10 is configured arbitrarily, provided that the grid lines may be imaged clearly on the touch screen 10; moreover, the directions of the grid lines and the dimensions of the grids may also be configured arbitrarily, provided that uniform grids may be formed. In addition, the detection plate 20 is place adjacent to the touch screen 10 in any direction, not necessarily along the edge of the touch screen 10, so as to detect ripples in any direction.

Besides, the aforementioned exemplary embodiments illustrate a method for detecting ripples according to embodiments of the present invention, taking a touch screen of a GF structure for example. However, the method for detecting ripples of the embodiments of the invention may not be limited to the touch screen of the GF structure; by way of example, such method may also apply to a touch screen for a GFF structure, or a touch screen of other structures which requires ripple-detection.

According to an embodiment, in order to facilitate configuration of the angle between the detection plate 20 and the touch screen 10, for example, a support for supporting the detection plate 20 and/or the touch screen 10 is provided, such that the detection plate 20 and the touch screen 10 are placed at a predetermined angle, and one edge of the detection plate 20 is adjacent to a corresponding edge of the touch screen 10.

Figure 2:
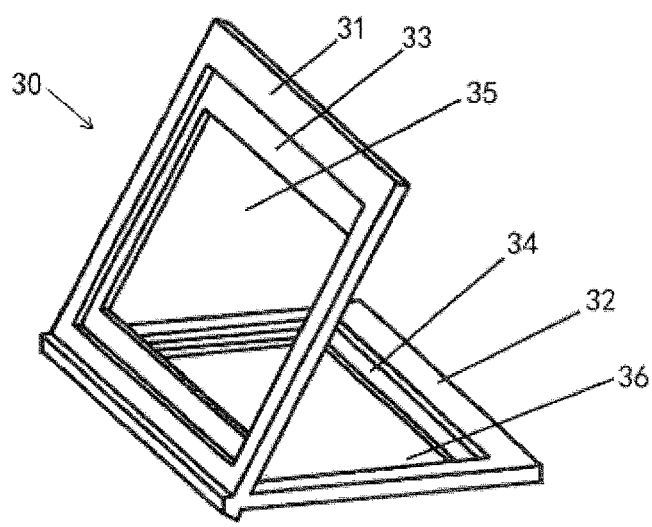
FIG. 2 illustrates, in perspective, a support structure for supporting the detection plate and/or the touch screen, according to an exemplary embodiment of the invention.

FIG. 2 illustrates an exemplary construction of a support 30 for supporting the detection plate 20 and/or the touch screen 10. As illustrated in FIG. 2, the support 30 comprises a first support 31 for holding the detection plate 20 and a second support 32 for holding the touch screen 10, the first support 31 and the second support 32 being configured to form the predetermined angle therebetween, e.g., an appropriate angle such as 45°, 60°, etc.

Specifically, the first support 31 comprises a first base 33 for placing the detection plate 20, the first base 33 being configured to be depressed below an upper surface of the first support 31 and to form an opening area 35 to expose the grid lines on the detection plate 20. The second support 32 comprises a second base 34 for placing the touch screen 10, the second base 34 being configured to be depressed below an upper surface of the second support 32 and to form an opening area 36. Optionally, e.g., the opening area 36 may not be formed.

By way of example, with the support 30, the placement of the detection plate 20 and the touch screen 10 may be facilitated; and the angle therebetween may be securely maintained.

It may also easily occur to those skilled in the art, of course, to design a support of other construction, e.g., only supporting the detection plate 20 or the touch screen 10; or otherwise, to manufacture two separated supports for supporting the detection plate 20 and the touch screen 10 respectively and then to assemble them together.

An illustrative method for manufacturing the detection plate of the invention is exemplified as below.

According to an exemplary embodiment of the invention, steps for manufacturing the detection plate 20 comprise: providing a rectangular base plate, the material of which is not restricted, e.g., the base plate may be a plastic plate, a metallic plate or a glass plate; manufacturing a paper sheet which is provided with a black background and a plurality of grids on the black background, the grids being arranged in a regular array and configured to be formed by intersecting a plurality of white grid lines extending in the first direction and a plurality of white grid lines extending in the second direction; and attaching the paper sheet onto the base plate so as to form the detection plate 20.

According to another exemplary embodiment of the invention, steps of manufacturing the detection plate 20 comprise: providing a rectangular base plate which has a black surface, and forming a plurality of grids on the black surface of the rectangular base plate, the grids being arranged in a regular array and configured to be formed by intersecting a plurality of white grid lines extending in the first direction and a plurality of white grid lines extending in the second direction, wherein the white grid lines are formed, e.g., by scoring or coating.

It should be appreciated by those skilled in this art that, in above embodiments of manufacturing the detection plate 20, the base plate may not necessarily be a rectangular shape, and may also be other shapes. The paper sheet may not necessarily have a black background or the base plate may not necessarily comprise a black surface; while the grid lines may not necessarily be white colored. On the contrary, the grid lines and the background may be for example in other colors, provided that the color of the grid lines and the background thereof are in stark contrast for facilitating observation.

A method for detecting ripples of the touch screen of the present invention, and a detection plate and a support used in the method is exemplified in embodiments as above. According to the method, the width of the ripples on the touch screen may be measured qualitatively and quantitatively, so as to determine the level of the ripples and prevent incorrect determination, such that unqualified touch screen products are prevented from entering the market and thus the resulting customer complaints and loss of product image may also be avoided.

It should be appreciated by those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present invention exemplarily, and should not be deemed as a restriction thereof.

Although several exemplary embodiments of the general concept of the present invention have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A detection assembly for detecting ripples of a touch screen, comprising:
   a detection plate, one surface of which is provided with a plurality of grids arranged in a regular array, which grids are formed by intersecting a plurality of grid lines extending in a first direction and a plurality of grid lines extending in a second direction; and
   a support for supporting at least one of both of the detection plate and the touch screen, such that the detection plate and the touch screen are placed at a predetermined angle therebetween and one edge of the detection plate is configured to be adjacent to one corresponding edge of the touch screen;
   wherein conditions of the ripples on the touch screen are determined according to curved conditions of the grid lines imaged on the touch screen, by imaging the grid lines on the detection plate onto the touch screen.

2. The detection assembly according to claim 1, comprising
   wherein the first direction and the second direction are arranged to be perpendicular to each other.

3. The detection assembly according to claim 2,
   wherein the grids are formed as a 10 mm×10 mm array of grids.

4. The detection assembly according to claim 1,
   wherein the predetermined angle is configured to be 60°.

5. The detection assembly according to claim 1,
   wherein the first support comprises a first base for placing the detection plate, the first base being configured to be depressed below an upper surface of the first support and to form an opening area to expose the grid lines on the detection plate; and
   wherein the second support comprises a second base for placing the touch screen, the second base being configured to be depressed below an upper surface of the second support.

6. A method for detecting ripples of a touch screen, comprising steps of:
   S1: manufacturing a detection plate, one surface of which is provided with a plurality of grids arranged in a regular array, which grids are formed by intersecting a plurality of grid lines extending in a first direction and a plurality of grid lines extending in a second direction;
   S2: placing the surface of the detection plate at a predetermined angle with respect to a surface of one side of the touch screen where the a glass plate is located, such that the grid lines on the detection plate are imaged on the touch screen; and
   S3: observing grid lines imaged on the touch screen, and determining the existence of ripples at a position of the touch screen corresponding to a curved portion of the imaged grid lines in case that the curved portion of the imaged grid lines is present.

7. The method for detecting ripples of a touch screen according to claim 6, further comprising a step of:
   S4: counting the number of the grids contained by the curved portion of the imaged grid lines in the direction thereof so as to determine the width of the ripples quantitatively.

8. The method for detecting ripples of a touch screen according to claim 6,
   wherein the first direction and the second direction are arranged to be perpendicular to each other in the step S1.

9. The method for detecting ripples of a touch screen according to claim 7,
   wherein the grids are formed as a 10 mm×10 mm array of grids in the step S1.

10. The method for detecting ripples of a touch screen according to claim 6, wherein the detection plate is placed along each edge of the touch screen in the step S2.

11. The method for detecting ripples of a touch screen according to claim 6, wherein the predetermined angle is configured to be 60° in the step S2.

12. The method for detecting ripples of a touch screen according to claim 6, the step S2 further comprising:

manufacturing a support for supporting at least one of both of the detection plate and the touch screen, such that the detection plate and the touch screen are placed at the predetermined angle and one edge of the detection plate is configured to be adjacent to one corresponding edge of the touch screen.

13. The method for detecting ripples of a touch screen according to claim 12,
wherein the support comprises a first support for holding the detection plate and a second support for holding the touch screen, the first support and the second support being configured to form the predetermined angle therebetween.

14. The method for detecting ripples of a touch screen according to claim 13,
wherein the first support comprises a first base for placing the detection plate, the first base being configured to be depressed below an upper surface of the first support and to form an opening area to expose the grid lines on the detection plate; and
wherein the second support comprises a second base for placing the touch screen, the second base being configured to be depressed below an upper surface of the second support.

15. The method for detecting ripples of a touch screen according to claim 1, the step S1 comprising:
providing a rectangular base plate;
manufacturing a paper sheet which is provided with a black background and a plurality of grids on the black background, the grids being arranged in the regular array and configured to be formed by intersecting a plurality of white grid lines extending in the first direction and a plurality of white grid lines extending in the second direction; and
attaching the paper sheet onto the base plate so as to form the detection plate.

16. The method for detecting ripples of a touch screen according to claim 6, the step S1 comprising:
providing a rectangular base plate which has a black surface, and
forming a plurality of grids on the black surface of the rectangular base plate, the grids being arranged in the regular array and configured to be formed by intersecting a plurality of white grid lines extending in the first direction and a plurality of white grid lines extending in the second direction.

17. The method for detecting ripples of a touch screen according to claim 6, wherein the touch screen comprises:
a glass plate;
an ink area configured to be formed at the periphery portions of the glass plate;
an adhesive layer configured to cover the glass plate and the ink area; and
a flexible film configured to be attached on the glass plate by the adhesive layer.

18. A detection plate for detecting ripples of a touch screen, wherein a surface of the detection plate is provided with a plurality of grids arranged in a regular array, which grids are formed by intersecting a plurality of grid lines extending in a first direction and a plurality of grid lines extending in a second direction; and
wherein conditions of the ripples on the touch screen are determined according to curved conditions of the grid lines imaged on the touch screen, by imaging the grid lines on the detection plate onto the touch screen.

19. The detection plate according to claim 18,
wherein the first direction and the second direction are arranged to be perpendicular to each other.

20. The detection plate according to claim 19,
wherein the grids are formed as a 10 mm×10 mm array of grids.

* * * * *